(12) United States Patent  (10) Patent No.: US 7,708,320 B2
Binder et al.  (45) Date of Patent: May 4, 2010

(54) PLUG-IN PART FOR A PLUG CONNECTOR ARRANGEMENT

(75) Inventors: Juergen Binder, Leutenbach (DE); Joerg Schmid, Spiegelberg (DE)

(73) Assignee: Alfred Kaercher GmbH & Co. KG, Winnenden (DE)

( * ) Notice: Subject to any disclaimer, the term of this patent is extended or adjusted under 35 U.S.C. 154(b) by 0 days.

(21) Appl. No.: 12/217,499

(22) Filed: Jul. 2, 2008

(65) Prior Publication Data

US 2009/0008928 A1    Jan. 8, 2009

Related U.S. Application Data

(63) Continuation of application No. PCT/EP2006/011083, filed on Nov. 18, 2006.

(30) Foreign Application Priority Data

Jan. 5, 2006    (DE)    ........................ 10 2006 002 564

(51) Int. Cl.
    *F16L 37/08* (2006.01)
(52) U.S. Cl. ........................ 285/308; 285/86; 285/321
(58) Field of Classification Search .................. 285/86, 285/307, 308, 321
    See application file for complete search history.

(56) References Cited

U.S. PATENT DOCUMENTS

| 2,823,934 | A | * | 2/1958 | Gorrell et al. | 285/277 |
| 2,913,263 | A | * | 11/1959 | Zajac | 285/277 |
| 3,314,696 | A | * | 4/1967 | Ferguson et al. | 285/148.14 |
| 3,450,424 | A | * | 6/1969 | Calisher | 285/305 |
| 3,574,359 | A | * | 4/1971 | Klein | 285/86 |
| 3,603,619 | A | * | 9/1971 | Bengesser et al. | 285/45 |
| 3,698,747 | A |  | 10/1972 | Wing et al. |  |
| 3,709,528 | A | * | 1/1973 | Cruse | 285/316 |
| 3,948,548 | A | * | 4/1976 | Voss | 285/321 |
| 4,541,657 | A | * | 9/1985 | Smyth | 285/305 |
| 4,700,926 | A | * | 10/1987 | Hansen | 251/149.8 |
| 4,884,829 | A |  | 12/1989 | Funk et al. |  |
| 5,366,259 | A | * | 11/1994 | Hohmann et al. | 285/305 |
| 5,553,895 | A | * | 9/1996 | Karl et al. | 285/39 |
| 5,704,658 | A | * | 1/1998 | Tozaki et al. | 285/305 |

(Continued)

FOREIGN PATENT DOCUMENTS

DE    86 24 767    12/1987

(Continued)

*Primary Examiner*—James M Hewitt
(74) *Attorney, Agent, or Firm*—Lipsitz & McAllister, LLC

(57) ABSTRACT

A plug-in part for a plug connector arrangement is provided. The plug-in part being in the form of a piece of tubing and having a sealing portion, comprising a sealing element enclosing the piece of tubing in a circumferential direction, and a locking portion with at least one undercut, and it being possible for the plug-in part to be plugged into the receptacle of a coupling part of the plug connector arrangement in order to produce a fluid-tight connection, and for at least one locking element of the coupling part to engage behind the plug-in part in the region of the undercut. In order to develop the plug-in part so as to reduce the risk of the sealing element being adversely affected, the undercut is formed by a protrusion which projects from the outside of the piece of tubing and extends circumferentially merely over a sub-region of the piece of tubing.

8 Claims, 7 Drawing Sheets

U.S. PATENT DOCUMENTS

| | | | | |
|---|---|---|---|---|
| 5,707,085 | A * | 1/1998 | Kubiak | 285/86 |
| 5,725,257 | A * | 3/1998 | Sakane et al. | 285/81 |
| 5,860,677 | A * | 1/1999 | Martins et al. | 285/26 |
| 5,882,044 | A * | 3/1999 | Sloane | 285/92 |
| 6,131,881 | A | 10/2000 | Preisser | |
| 6,371,528 | B1 * | 4/2002 | Kimura | 285/305 |
| 6,676,172 | B2 * | 1/2004 | Alksnis | 285/319 |
| 6,688,654 | B2 * | 2/2004 | Romero | 285/308 |
| 6,983,958 | B2 * | 1/2006 | Rautureau | 285/305 |
| 7,021,669 | B1 | 4/2006 | Lindermeir et al. | |
| 7,083,202 | B2 * | 8/2006 | Eberle et al. | 285/124.4 |
| 7,387,318 | B2 * | 6/2008 | Yoshida | 285/321 |
| 2003/0052484 | A1 * | 3/2003 | Rautureau | 285/305 |
| 2004/0021316 | A1 * | 2/2004 | Rogg | 285/308 |
| 2004/0037627 | A1 * | 2/2004 | Eberle et al. | 403/242 |
| 2007/0029796 | A1 * | 2/2007 | Bibby | 285/308 |
| 2007/0236013 | A1 * | 10/2007 | Hartmann | 285/321 |

FOREIGN PATENT DOCUMENTS

| | | |
|---|---|---|
| DE | 198 37 767 | 2/2000 |
| DE | 198 54 685 * | 5/2000 |
| DE | 199 15 291 | 10/2000 |
| DE | 100 43 619 | 3/2002 |
| EP | 1 166 003 | 1/2002 |

* cited by examiner

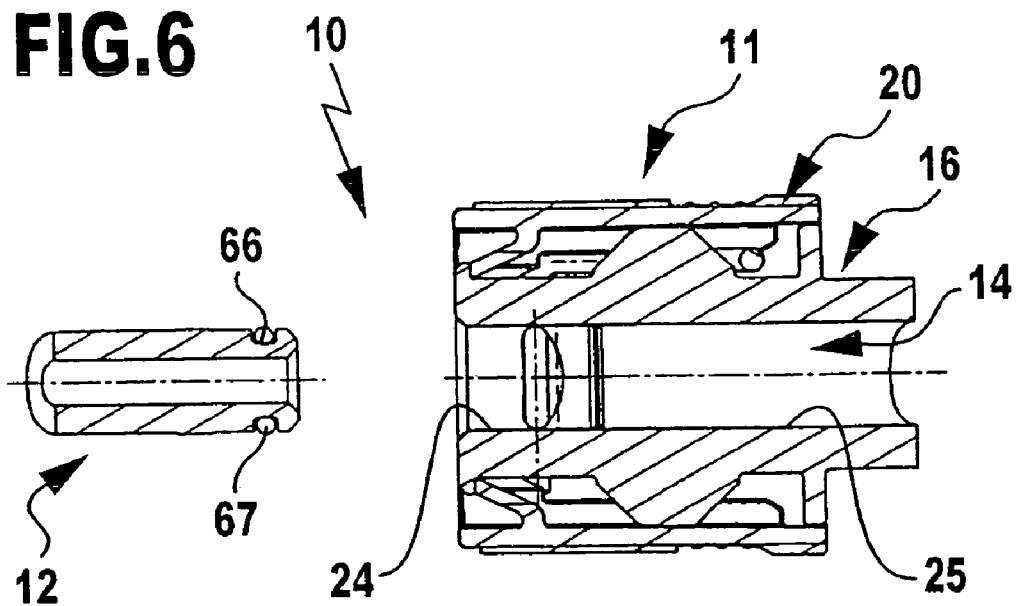
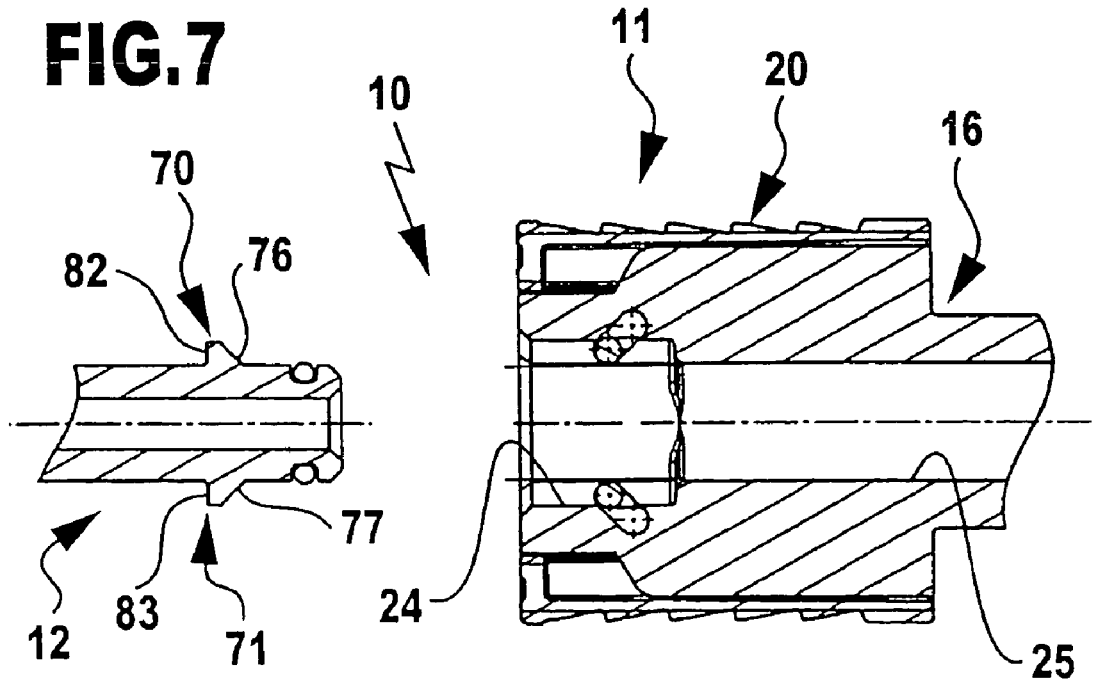

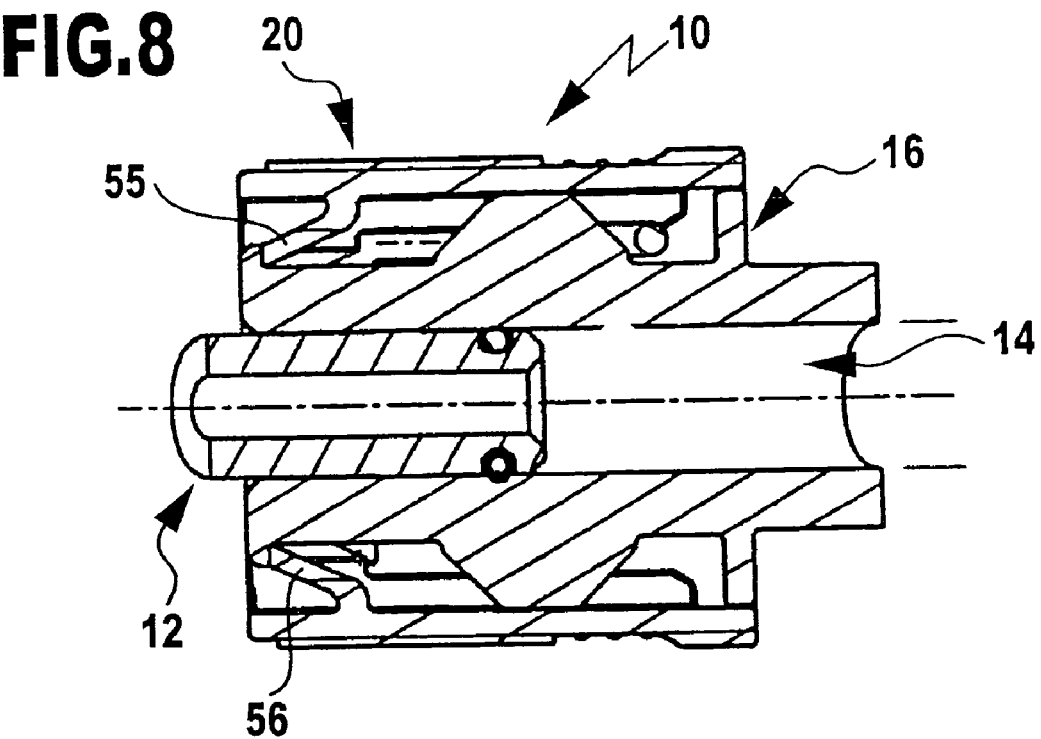
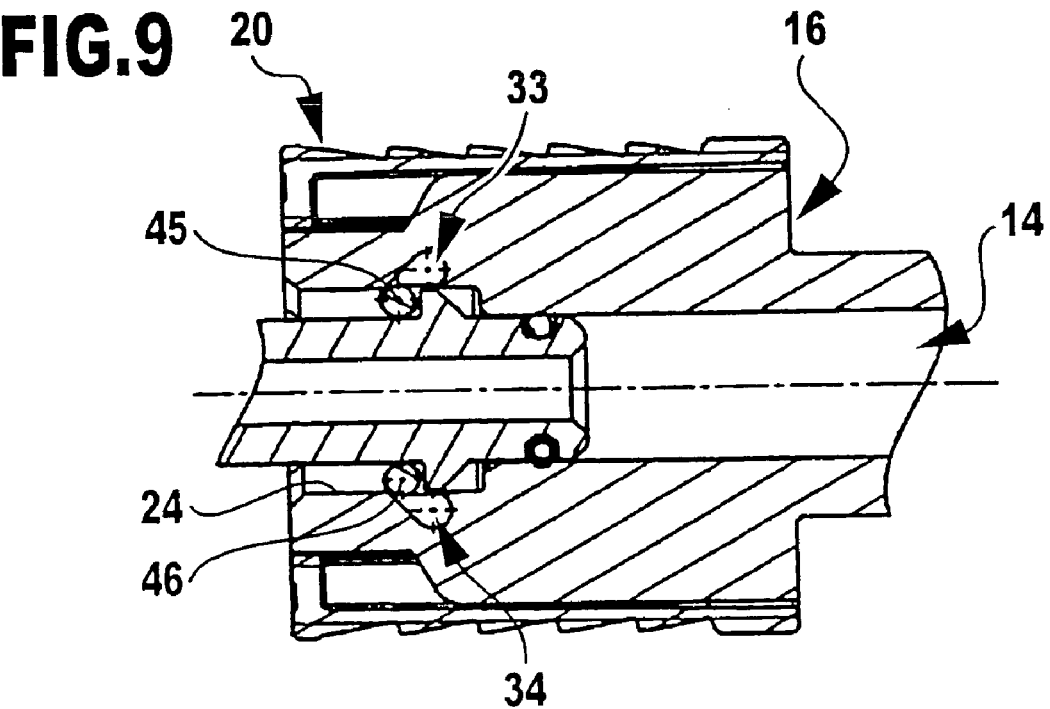

PLUG-IN PART FOR A PLUG CONNECTOR ARRANGEMENT

This application is a continuation of international application number PCT/EP2006/011083 filed on Nov. 18, 2006.

The present disclosure relates to the subject matter disclosed in international application number PCT/EP2006/011083 of Nov. 18, 2006 and German application number 10 2006 002 564.4 of Jan. 5, 2006, which are incorporated herein by reference in their entirety and for all purposes.

BACKGROUND OF THE INVENTION

The invention relates to a plug-in part for a plug connector arrangement, the plug-in part being in the form of a piece of tubing and having a sealing portion, comprising a sealing element enclosing the piece of tubing in a circumferential direction, and a locking portion with at least one undercut, and it being possible for the plug-in part to be plugged into the receptacle of a coupling part of the plug connector arrangement in order to produce a fluid-tight connection, and for at least one locking element of the coupling part to engage behind the plug-in part in the region of the undercut.

Such plug-in parts are used in plug connector arrangements by means of which pipes or hoses can be connected to one another in a releasable manner. For this purpose, the plug connector arrangement has a coupling part with a receptacle into which the plug-in part can be plugged. By means of locking elements, the plug-in part can be locked in the coupling part. The plug-in part is in the form of a piece of tubing and, adjacent to its free end, has a sealing portion with a sealing element which fully encloses the piece of tubing in the circumferential direction. If the plug-in part is plugged into the receptacle of the coupling part, then the sealing element engages in a fluid-tight manner against the wall of the receptacle, and a locking element of the coupling part engages behind at least one undercut, which is positioned in the region of a locking portion of the plug-in part. The plug-in part is thus secured in the direction of its longitudinal axis in the receptacle of the coupling part, with a fluid-tight connection being maintained in the process.

Such plug-in parts are known, for example, from German Utility Model DE 86 24 767 U1. In order to lock the plug-in part in the receptacle of the coupling part, this utility model proposes the use of a locking plug having two legs and a cross-piece connecting the two legs to one another, the legs each forming a locking element. The plug-in part is in the form of a piece of tubing and has a conical portion which is adjoined by an annular groove which, on its side which is directed away from the conical portion, is bounded by a cylindrical portion. Both the cylindrical portion and the conical portion fully enclose the known piece of tubing in the circumferential direction. The rear side of the conical portion, this rear side being directed away from the front side of the known plug-in part, forms an undercut, and this has two locking elements engaging behind it when the plug-in part is inserted into the receptacle of the coupling part.

The fluid-tight connection between the plug-in part and the coupling part is ensured by a sealing element. If the sealing element is adversely affected, this results in it being possible for a fluid which is routed through the plug-in part and the coupling part to escape out of the receptacle of the coupling part via the locking portion.

It is an object of the present invention to develop a plug-in part of the type mentioned in the introduction so as to reduce the risk of the sealing element being adversely affected.

SUMMARY OF THE INVENTION

This object is achieved according to the invention, in the case of a plug-in part of generic type, by the undercut being formed by a protrusion which projects from the outside of the piece of tubing and extends circumferentially merely over a sub-region of the piece of tubing.

On account of the undercut extending circumferentially only over a sub-region, the plug-in part, in the region of the locking portion, has an asymmetrical cross-section, as seen with respect to the longitudinal axis of the plug-in part. It is thus possible, in constructionally straightforward manner, for the plug-in part to be secured against rotation in the receptacle of the coupling part. As a result of it thus being possible for the plug-in part to be secured in a non-rotatable manner in the receptacle of the coupling portion, the situation where the sealing element is subjected to mechanical loading as a result of the plug-in part rotating can be avoided. The plug-in part, which in the region of the locking portion is formed asymmetrically in respect of rotation about its longitudinal axis, is thus distinguished by a long service life.

The plug-in part according to the invention, moreover, has the advantage that less material is required to produce it than is the case for conventional plug-in parts, because the protrusion which is necessary for forming the undercut extends circumferentially merely over a sub-region of the piece of tubing. In order to produce the plug-in part, it is thus possible to reduce the amount of material used, so that the plug-in part can be produced particularly cost-effectively.

It is particularly advantageous if the at least one protrusion is adjoined in the circumferential direction by a flattened circumferential portion of the piece of tubing. The flattened circumferential portion allows surface engagement of the plug-in part, in the region of the locking portion, against a wall of the receptacle of the coupling part. This can increase the level of mechanical loading to which the plug-in part can be subjected, when plugged into the receptacle of the coupling part. Furthermore, providing at least one flattened circumferential portion makes it possible to produce the plug-in part in a manner which is particularly optimized in terms of material. Added to this is the fact that providing at least one flattened circumferential portion makes it easier for a user to handle the plug-in part in order to produce a fluid-tight connection to a corresponding coupling part since, by way of the flattened circumferential portion, the user can intuitively detect the orientation of the plug-in part which is necessary in order to introduce the plug-in part into the receptacle.

In the case of a preferred embodiment, the locking portion has two protrusions which are located diametrically opposite one another and are connected to one another via flattened circumferential portions. The protrusions each form an undercut, so that the locking elements can engage behind the plug-in part, on diametrically opposite sides, when the plug-in part is plugged into the receptacle of the coupling part. A respective flattened circumferential portion runs between the protrusions, and allows surface engagement of the plug-in part in the receptacle of the coupling part. The flattened circumferential portions are preferably oriented parallel to one another.

It is advantageous if the at least one protrusion is configured in the manner of a bead. As an alternative, it may be provided that the protrusion is configured in the manner of a pin or wing and projects preferably radially outwardly from the piece of tubing.

The plug-in part according to the invention is preferably used in a plug connector arrangement which has a coupling part with locking elements which are biased resiliently into a locking position. It is advantageous here if, in the direction of the front side of the piece of tubing, the at least one protrusion of the plug-in part has a conical end face. Such a configuration has the advantage that, when the plug-in part is inserted into the corresponding receptacle of the coupling part, a locking element which is biased into the locking position can be pushed to the side by means of the protrusions without an additional actuating element having to be actuated by the user for this purpose.

In order to enlarge the region of surface engagement of the plug-in part in the receptacle of the corresponding coupling part, it is advantageous if the protrusion has an outer periphery in the form of a circular arc which is formed by a lateral cylindrical surface. This ensures that the protrusion can also have its outside positioned in surface contact against a wall of the receptacle. Merely linear engagement of the protrusion against the wall of the receptacle is thus avoided.

The undercut, which extends circumferentially merely over a sub-region of the piece of tubing, is preferably formed by a radially oriented rear side of the protrusion. This makes it possible for the plug-in part to be secured axially in a particularly reliable manner in the receptacle of the coupling part.

The spacing between the undercut and the front side of the plug-in part is preferably less than 2 times, in particular less than 1.5 times, the external diameter of the sealing portion. This makes it possible to ensure, on the one hand, a compact construction of the plug-in part and of the corresponding coupling part and, on the other hand, sealed engagement of the sealing element against the wall of the receptacle and, at the same time, reliable locking of the plug-in part in the receptacle.

The invention relates not just to a plug-in part of the type explained above, but also to a plug connector arrangement comprising such a plug-in part and comprising a coupling part which has a receptacle, into which the plug-in part can be plugged, and a locking device with at least one locking element which, in a locking position, penetrates laterally into a locking region of the receptacle and can be moved into a release position by means of an actuating element of the coupling part, the locking region having a cross-section which corresponds to the cross-section of the locking portion of the plug-in part in the region of the at least one protrusion.

In the case of such a configuration, the locking region of the receptacle, like the locking portion of the plug-in part, is configured asymmetrically in respect of rotation about the longitudinal axis of the plug-in part, so that the plug-in part, which engages with surface contact against the wall of the locking region, is retained, non-rotationally, in the receptacle.

The receptacle may comprise, for example, two flat wall portions which are located opposite one another and are connected to one another via two wall portions in the form of circular arcs. The arcuate wall portions may have a through-passage via which a respective locking element can penetrate laterally into the receptacle, and the flat wall portions serve for the surface engagement of the corresponding flattened circumferential portions of the plug-in part.

A more specific explanation will be given by the following description of a preferred embodiment of the invention in conjunction with the drawings.

BRIEF DESCRIPTION OF THE DRAWINGS

FIG. 6 shows a sectional view along line 6-6 in FIG. 3 prior to the insertion of the plug-in part into the coupling part;

FIG. 7 shows a sectional view along line 7-7 in FIG. 3 prior to the insertion of the plug-in part into the coupling part;

FIG. 8 shows a sectional view corresponding to FIG. 6 following the insertion of the plug-in part into the coupling part;

FIG. 9 shows a sectional view corresponding to FIG. 7 following the insertion of the plug-in part into the coupling part;

DETAILED DESCRIPTION OF THE INVENTION

Figure 1:
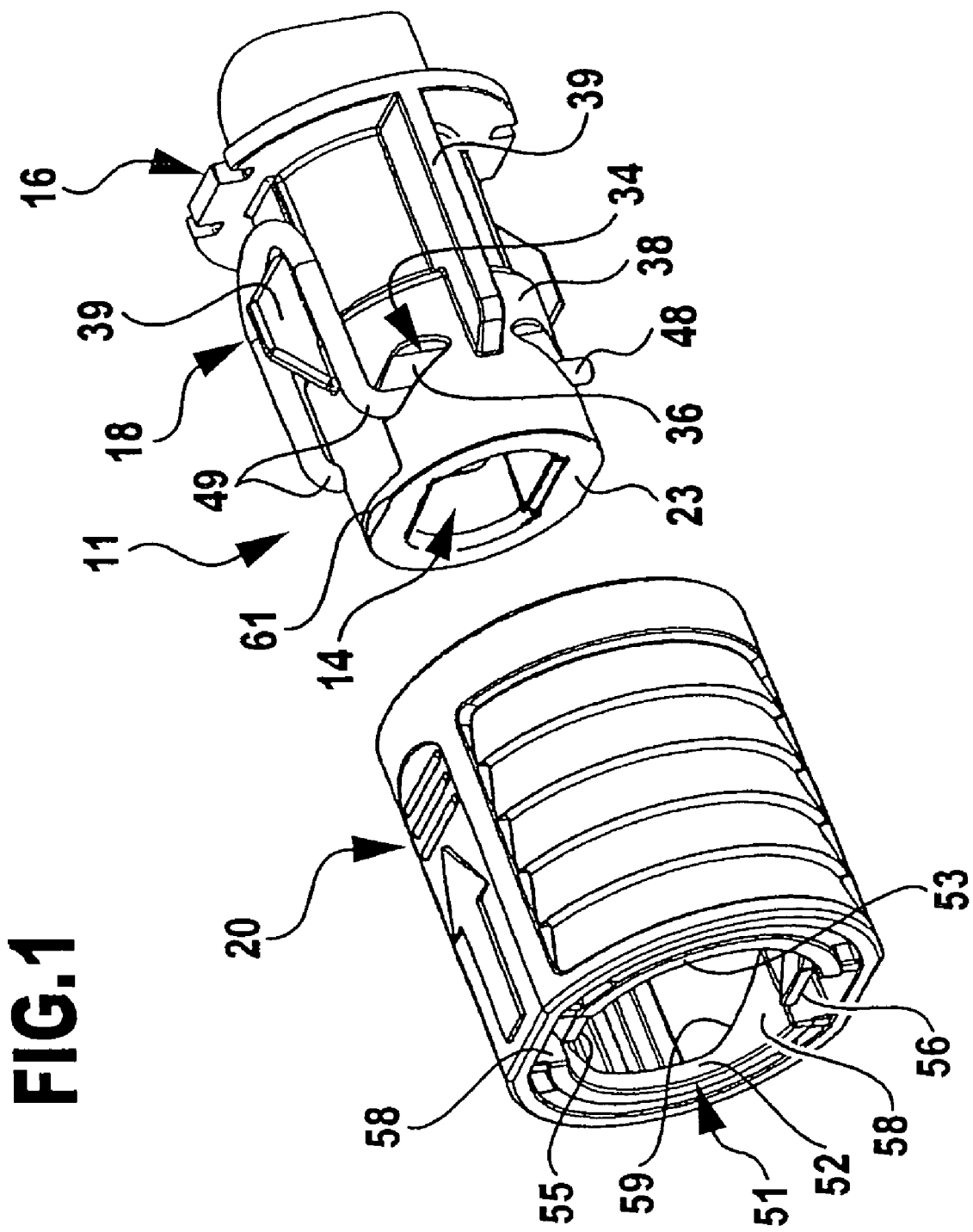
FIG. 1 shows a perspective illustration, in exploded form, of a coupling part of a plug connector arrangement.
Figure 2:
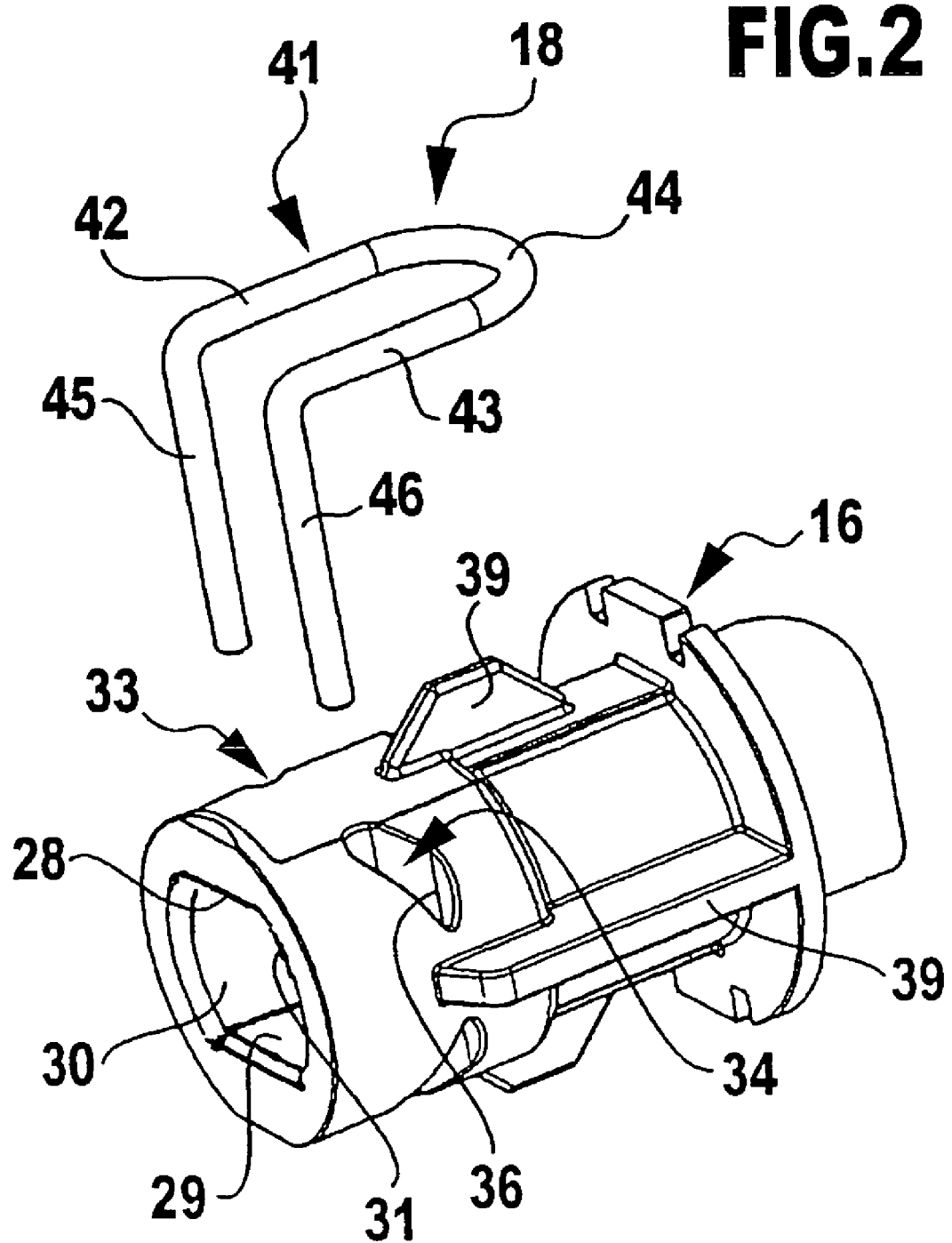
FIG. 2 shows a perspective illustration, in exploded form, of a coupling body and of a locking device of the coupling part from FIG. 1.

The drawing illustrates, schematically, a plug connector arrangement that is designated overall by the reference numeral 10 and has a coupling part 11 and a plug-in part 12 which, in order to produce a fluid-tight connection, can be inserted into a receptacle 14 of the coupling part.

The coupling part 11 is formed in three parts and comprises a coupling body 16, which is substantially cylindrical and includes the receptacle 14, as well as a locking device 18 and an actuating sleeve 20.

As is clear, in particular, from FIGS. 6 to 9, the receptacle 14 is configured as a through-bore which passes through the coupling body 16 and forms a locking region 24, which opens out in the front side 23 of the coupling body 16, and an adjoining sealing region 25. The sealing region 25 is cylindrically symmetrical, whereas the locking region 24 has two flat wall portions 28, 29 which are located diametrically opposite one another and are connected to one another via wall portions, 30, 31 in the form of circular arcs. The flat wall portions 28, 29 are oriented parallel to one another.

On a level with the locking region 24, the coupling body 16 has two oblong holes 33, 34 which open out laterally into the locking region 24, pass through the coupling body 16 and have sliding surfaces 35, 36 oriented obliquely in relation to the longitudinal axis of the coupling body.

A plurality of guide ribs 39 project radially outwardly, at a uniform spacing from one another in the circumferential direction, from the outside 38 of the coupling body 16.

The locking device 18 comprises a U-shaped spring element 41 with two legs 42, 43 which are oriented parallel to the longitudinal axis of the coupling body 16 and are connected to one another via an arcuate cross-piece 44. The free ends of the legs 42 and 43 are adjoined in each case by a respective locking pin 45, 46 which is oriented at right angles to the respective leg 42, 43 and penetrates into a respective oblong hole 33, 34 and passes through the same. This is clear from FIG. 1. In the region of their free ends, the locking pins 45, 46 project in each case, by way of a first end region 48, beyond the outside 38 of the coupling body 16, and the locking pins 45 and 46 also project beyond the outside 38 by way of a second end region 49, which adjoins the respective leg 42, 43.

Figure 10:
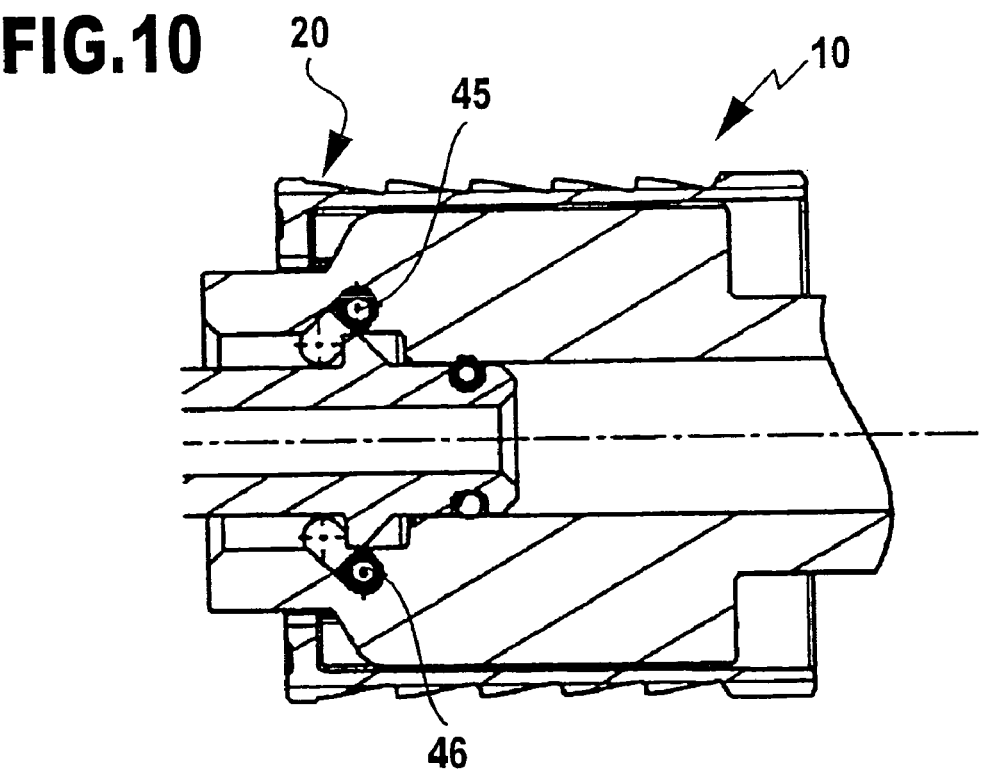
FIG. 10 shows a sectional view corresponding to FIG. 7 as the plug-in part is being released from the coupling part.
Figure 11:
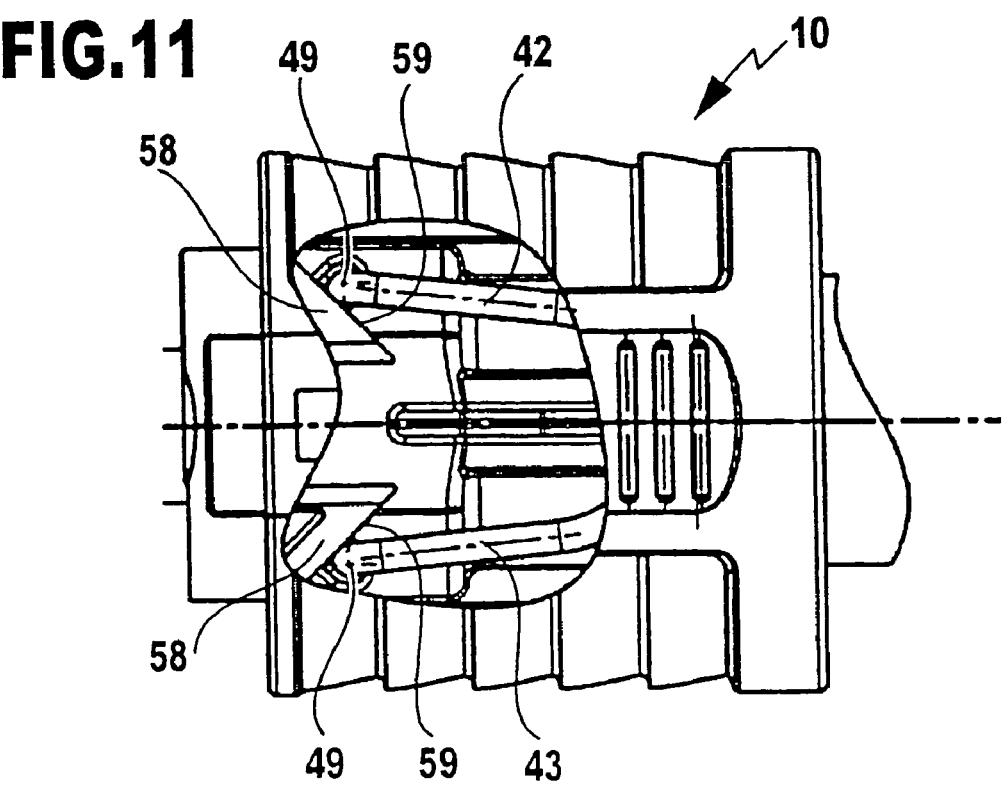
FIG. 11 shows a partially cut-away plan view of the coupling part as the plug-in part is being released.

The locking pins 45, 46 can be gripped in each case at their two end regions 48, 49 on the outside 38 of the coupling body 16, so that starting from their locking position, which is illustrated in FIG. 1, the locking pins 45, 46 can be transferred, counter to an elastic restoring force exerted by the spring element 41, into a release position, which is illustrated in FIGS. 10 and 11, the locking pins sliding along the sliding surfaces 35 and 36 of the oblong holes 33, 34, respectively. In their release position, the locking pins 45, 46 are spaced apart from one another to a greater extent than in their locking position.

In order to displace the locking pins 45, 46 along the sliding surfaces 35, 36, use is made of the actuating sleeve 20 which, on the end side, has an annular shoulder 51 which juts back in the inward direction and has two shoulder portions 52, 53 which are located diametrically opposite one another and, between them accommodate a respective inwardly projecting latching protrusion 55, 56. Directly adjacent to the latching protrusions 55 and 56, a respective stop element 58 is integrally formed on the shoulder portions 52 and 53, and this stop element, in the direction away from the front side 23, has a stop surface 59 oriented obliquely in relation to the longitudinal axis of the coupling body 16.

The actuating sleeve 20 can be placed onto the coupling body 16 at the front, in which case it latches to the coupling body 16, which, in line with the front side 23, has two outer protrusions 61, behind which the latching protrusions 55 and 56 of the actuating sleeve 20 engage.

If the actuating sleeve 20 is displaced along the coupling body 16 in the direction away from the front side 23, then the stop surfaces 59 engage in each case against a respective end region 48, 49 of the locking pins 45 and 46 and, as the actuating sleeve 20 is displaced further, the locking pins 45, 46 are displaced along the associated sliding surfaces 35, 36 in the direction of their release position.

Figure 3:
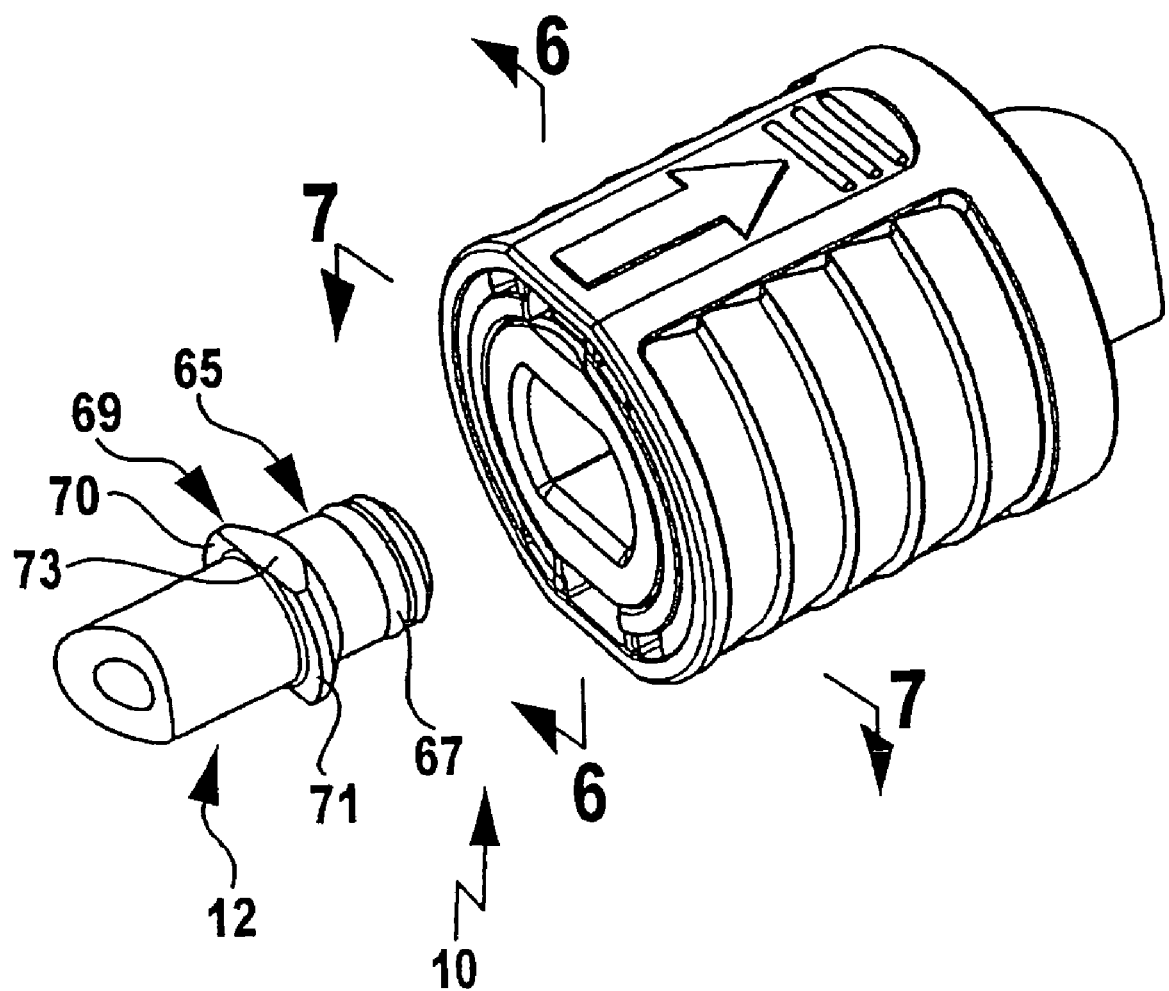
FIG. 3 shows a plug connector arrangement having a coupling part according to FIG. 1 and a plug-in part according to the invention.
Figure 4:
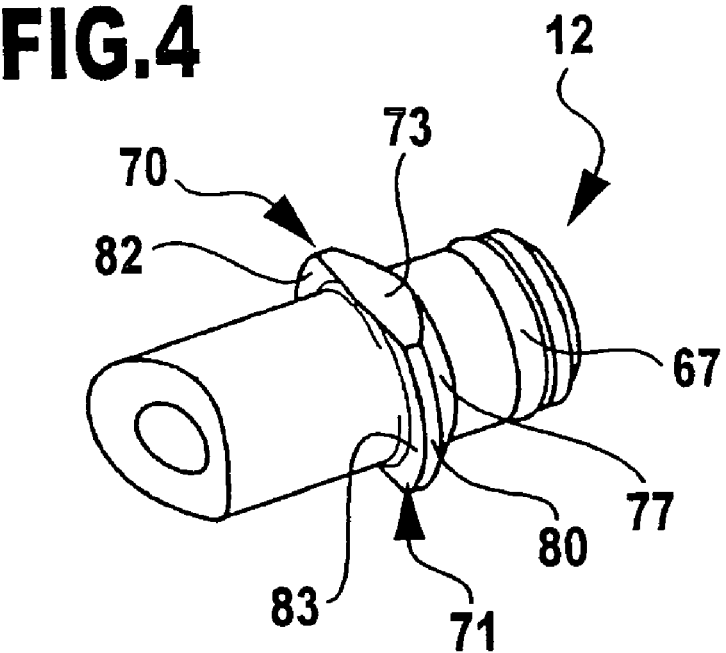
FIG. 4 shows a perspective illustration of the plug-in part from FIG. 3, as seen obliquely from the rear.
Figure 5:
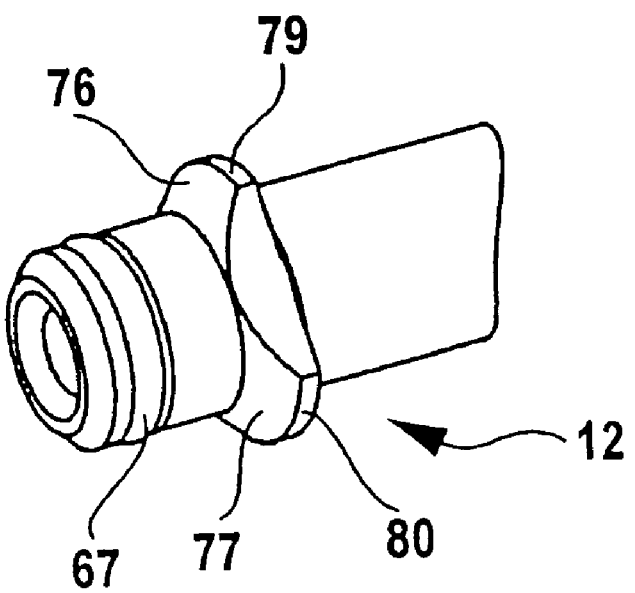
FIG. 5 shows a perspective illustration of the plug-in part from FIG. 3, as seen obliquely from the front.

The configuration of the plug-in part 12 according to the invention is particularly clear from FIGS. 3, 4 and 5. The plug-in part 12 is in the form of a piece of tubing and has a sealing portion 65 with an annular groove 66 which runs all the way round in the circumferential direction and in which a sealing ring 67 is disposed. The sealing portion 65 is adjoined by a locking portion 69 having two protrusions in the form of outer beads 70, 71 which are located diametrically opposite one another, extend circumferentially merely over a sub-region of the plug-in part and are connected to one another via flattened circumferential portions 73, 74. The spacing between the flattened circumferential portions 73, 74 is identical to the external diameter of the sealing portion 65. The flattened circumferential portions 73, 74 are oriented parallel to one another.

The outer beads 70, 71 have a respective conical end face 76, 77, which widens in the direction away from the free end of the plug-in part. The conical end faces 76, 77 are adjoined by a respective lateral cylindrical surface 79, 80, which is arcuate in cross-section and is adjoined in the axial direction by a respective radially oriented terminating surface 82, 83. The terminating surfaces 82, 83 each form an undercut of the plug-in part 12.

At the outer beads 70, 71, the cross-section of the plug-in part 12 corresponds to the cross-section of the locking region 24 of the coupling body 16. In order to produce a fluid-tight connection, the plug-in part 12 can thus be inserted into the receptacle 14 of the coupling body 16, the plug-in part 12 engaging with surface contact against the wall of the receptacle 14 both in the region of the sealing portion 65 and in the region of the locking portion 69. If the plug-in part 12 is inserted into the receptacle 14, then the conical end faces 76, 77 engage against the locking pins 45, 46, so that, as the plug-in part 12 is inserted further into the receptacle 14, these locking pins are pushed laterally outwards and the plug-in part 12 can thus be guided through between the locking pins 45, 46. The sealing portion 65 of the plug-in part 12 can thus be positioned on a level with the sealing region 25 of the coupling body 16, the sealing ring 67 engaging in a fluid-tight manner against the wall of the sealing region 25. This is particularly clear from FIGS. 8 and 9.

The plug-in part 12 can be inserted into the receptacle 14 until the locking pins 45, 46, which are biased resiliently into their locking position, engage behind the undercuts, which are formed by the outer beads 70, 71, and thus secure the plug-in part axially in the receptacle 14. The locking pins 45, 46 therefore form locking elements of the coupling part 11. On account of both the locking portion 69 of the plug-in part 12 and the locking region 24 of the coupling body 16 being configured asymmetrically in respect of rotation about the longitudinal axis of the plug-in part 12 and of the coupling body 16, the plug-in part 12 is retained in a rotationally fixed manner in the receptacle 14. The sealing ring 67 is thus relieved of rotary movement, which could result in wear to the sealing ring. Mechanical wear to the sealing ring 67 is thus kept to a particularly low level. Moreover, the asymmetrical configuration, in respect of rotation about the longitudinal axis of the plug-in part 12 and of the coupling body 16, ensures that the plug-in part 12 can only be inserted into the receptacle 14 with predefined orientation. Furthermore, providing the flattened circumferential portions 73, 74 allows the plug-in part 12 to be produced in a manner which is optimized in terms of material. The flattened circumferential portions 73, 74, moreover, ensure that it is also possible for the plug-in part 12, in the region of the locking portion 69, to be positioned in surface contact against the wall of the receptacle 14.

The invention claimed is:
1. Plug connector arrangement, comprising:
 a plug-in part comprising:
  a piece of tubing,
  a sealing portion, said sealing portion comprising a sealing element enclosing the piece of tubing in a circumferential direction, and
  a locking portion with at least one undercut, the at least one undercut being formed by at least one protrusion which projects from outside of the piece of tubing and extends circumferentially over a sub-region of the piece of tubing, providing the piece of tubing with an asymmetrical cross-section in a region of the at least one protrusion, and
 a coupling part comprising:
  a receptacle, into which the plug-in part can be plugged, and
  a locking device with at least one locking element which, in a locking position, penetrates laterally into a locking region of the receptacle and is adapted to be moved into a release position by means of an actuating element, the locking region having an asymmetrical cross-section which corresponds to the asymmetrical cross-section of the locking portion of the plug-in part in the region of the at least one protrusion,
 wherein:
  the plug-in part is adapted to be plugged into the receptacle of the coupling part in order to produce a fluid-tight connection,
  the at least one locking element of the coupling part engages with the plug-in part in a region of the at least one undercut, and
  the asymmetrical cross-section secures the plug-in part against rotation when plugged into the receptacle.

2. Plug connector arrangement according to claim 1, wherein the at least one protrusion is adjoined in the circumferential direction by a flattened circumferential portion.

3. Plug connector arrangement according to claim 1, wherein the locking portion has two protrusions which are located diametrically opposite one another and are connected to one another via flattened circumferential portions.

4. Plug connector arrangement according to claim 1, wherein the at least one protrusion comprises a bead.

5. Plug connector arrangement according to claim 1, wherein in a direction of a free end of the piece of tubing, the at least one protrusion has a conical end face.

6. Plug connector arrangement according to claim 1, wherein the at least one protrusion has an outer periphery in a form of a circular arc which is formed by a lateral cylindrical surface.

7. Plug connector arrangement according to claim 1, wherein the at least one undercut is formed by a radially oriented rear side of the at least one protrusion.

8. Plug connector arrangement according to claim 1, wherein a spacing between the at least one undercut and a free end of the plug-in part is less than 2 times an external diameter of the sealing portion.

* * * * *